United States Patent [19]

Liu et al.

[11] Patent Number: 4,595,297

[45] Date of Patent: Jun. 17, 1986

[54] METHOD AND APPARATUS FOR MEASURE OF HEAT FLUX THROUGH A HEAT EXCHANGE TUBE

[75] Inventors: Chih-hsiung F. Liu; Lynton W. R. Dicks, both of Houston, Tex.

[73] Assignee: Shell Oil Company, Houston, Tex.

[21] Appl. No.: 787,583

[22] Filed: Oct. 15, 1985

[51] Int. Cl.⁴ .................... B23P 15/26; G01K 17/06; G01N 25/00
[52] U.S. Cl. ................. 374/29; 29/157.3 R; 165/158; 228/103; 228/183; 374/43
[58] Field of Search ................... 374/29, 43; 165/158; 29/157.3 R; 228/183, 103

[56] References Cited

U.S. PATENT DOCUMENTS

| | | | |
|---|---|---|---|
| 1,528,383 | 3/1925 | Schmidt | 374/30 |
| 3,384,165 | 5/1968 | Mathews | 165/39 X |
| 3,912,148 | 10/1975 | Johnson | 29/157.3 R X |
| 4,170,055 | 10/1979 | Zethraeus | 29/157.3 R |
| 4,193,180 | 3/1980 | Press | 29/157.3 R X |
| 4,219,073 | 8/1980 | Talmadge et al. | 165/158 X |
| 4,479,727 | 10/1984 | Domingorena et al. | 374/43 |
| 4,498,529 | 2/1985 | Palezieux et al. | 228/183 X |
| 4,527,908 | 7/1985 | Arisi | 374/29 X |

Primary Examiner—Daniel M. Yasich

[57] ABSTRACT

The present invention relates to a method and apparatus used to determine the heat flux through a portion of a surface of a heat exchanger tube, using heat flux sensor means that is installed on the inner wall of the heat exchanger tube and send a signal to a connected heat flux meter.

16 Claims, 9 Drawing Figures

METHOD AND APPARATUS FOR MEASURE OF HEAT FLUX THROUGH A HEAT EXCHANGE TUBE

BACKGROUND OF THE INVENTION

1. Field of the Invention

The present invention relates to the measurement of heat flux through a portion of the surface of a heat exchanger tube, by use of a heat flux meter mounted on the surface of the inside wall of the heat exchanger tube. The heat flux meter is capable of measuring the high heat fluxes encountered in a boiling heat transfer system.

2. Description of the Prior Art

Many heat flux meters or heat flow measurement devices have been disclosed in the prior art that are capable of measuring heat flux (or heat flow) into or out of heat exchanger tubes. These heat flux meters are designed to possess a low thermal resistance, preferably lower than the thermal resistance of the heat exchanger tube itself in order not to intrusively alter the measured value of the heat flux passing through the heat exchange tube. The thermal resistance of these heat flux meters must also be known in order to correct for their presence in the thermal circuit consisting in part of the meter and the tube.

A typical heat flux meter is disclosed for example in U.S. Pat. No. 1,528,383. The device in this '383 patent uses a plurality of thermopiles arranged on a measuring plate, the thermopiles or thermocouples consisting of alternate wires of copper and constantan coupled or soldered together. The thermocouples are typically arranged in an array of hot junctions separated by a relatively thick layer of insulation from a corresponding array of cold junctions, well known to the art. Due to the heat flow through the measurement device a higher temperature exists at the hot junctions than at the cold junctions. A resultant electric current is generated due to this temperature difference which when measured indicates the amount of heat flux passing through the surface area monitored by the thermocouple apparatus. It should be noted that the insulation used between the array of hot and cold junctions increase the overall thermal resistance of the device.

In considering the use of the '383 device in high heat flux applications it must be remembered that extremely high heat fluxes in the order of 100,000 BTU/hr. $FT^2$ are typically encountered in boiling heat transfer system designs. As can be imagined, the soldered thermocouple system of the '383 device with its relatively high thermal resistance and questionable reliability at these high heat flux levels cannot be used to measure the heat fluxes encountered in a boiling heat transfer system.

If a device of this design were mounted within a heat exchanger tube that had fluid flowing through it, the thickness of the insulation layer would restrict the fluid flow through the tube.

Available materials therefore appear to be limited to thin laminated metallic sections which currently are attached to a heat transfer surface by either a clamp or ceramic cement well known to the art, for example, and are used to measure high heat fluxes, as discussed in the thermal flux meter sales literature published by International Thermal Instrument Co., P.O. Box 309, Del Mar, CA 92014.

Such thin metallic meters operate on the same principle as the thermocouple discussed earlier. Whereas in a thermocouple, however, only two dissimilar metals are connected together, in the thin metallic meters several layers of dissimilar metal may be laminated together.

It is desirable to install these thin metallic heat flux meters in a manner to minimize disruption to the normal heat flow through the surface of the heat exchange tube. In other words, the intrusive nature of the heat flux meter must be minimized. The meters therefore should not be attached to the heat exchanger tube by, for example, a process such as arc welding. The arc welding material deposited upon the heat exchanger tube would change the normal heat flow through the surface(s) of the heat exchanger tube and the voids subsequently left under the surface area of the heat flux meter after the edges of the meter are welded to the tube would disrupt the natural heat flux through the surface(s) of the heat exchanger tube, and subsequently reduce the accuracy of the signal generated by these meters. Similar problems are encountered in the use of ceramic cement.

An apparatus and method of installation of the apparatus needs to be developed therefore that minimizes the disruption of the natural heat flow through the surface(s) of the heat exchanger tube, and also minimizes the disruption of the normal fluid flow through the heat exchanger tube itself. The apparatus must also be capable of withstanding the high heat fluxes associated with a boiling heat transfer system.

SUMMARY OF THE INVENTION

The apparatus of the present invention comprises three relatively thin layers of conductive metal which when laminated together form a heat flux meter. The heat flux meter is installed by a pocess such as roller-swaging, diffusion welding, or brazing to the inner wall of the heat exchanger tube. If the roll-swaging process is used to install the heat flux meter it may be performed in a manner similar to that set forth in U.S. Pat. No. 3,979,810, where an apparatus and method is described for roller-swaging a heat exchanger tube into a tube sheet. Note that during the lamination of the layers which form the heat flux meter no insulation is placed between the layers, nor between the outer diameter of the heat flux meter and the inner wall of the heat exchanger tube.

It is desirable to mount the thin heat flux meter on the inner diameter of the heat exchanger tube in order to place the meter in a relatively cooler environment, which would tend to prolong the life and/or the subsequent accuracy of the heat flux meter. Additionally the surface condition of the outer surface of the heat exchanger tube will not be altered when the meter is mounted inside. Many heat measurement devices mounted on the outside have this drawback and can significantly change the flow of radiant heat through the outer surface of the tube.

It should be noted, for example, that U.S. Pat. No. 4,102,196 discloses the installation of heat flux meters within the inner diameter of a tube. The heat flux meters used within the tube however are formed from the same bulky thermocouple array elements mentioned earlier which cannot withstand the high heat flux rates encountered in a boiling heat transfer system. The heat flux meters disclosed in this patent '196, due to their general bulkiness, also would be unsuitable for installation within a heat exchanger tube having fluid flowing through the tube due to the resultant restriction of flow through the tube. The bulkiness of these devices can again be seen to be caused primarily by use of an insulation layer between the hot and cold junction thermocouple arrays used to form the working elements of the thermocouple.

Since the heat flux meter is not arc welded in the inner (or outer) wall of the heat exchanger tube, no voids or large welding deposits which would result from welding exist after the installation. Avoidance of the arc welding process in the installation of this apparatus therefore insures that a relatively uninterrupted heat flow still exists through the surfaces of the heat exchanger tube.

Since no insulation is used between the layers of the heat flux meter no appreciable heat flow disruptions occur and the contact resistance between the layers of the entire apparatus can be seen to be relatively negligible.

The frontal cross-sectional area presented to the fluid flowing through the heat exchanger tube by the thin sectioned heat flux meter is minimized by the elimination of the insulation between the layers. The relatively thin heat flux meter therefore causes a minimum amount of fluid flow disruptions through the heat exchanger tube.

A heat flux meter of this design also has several other advantages. No attempt need be made to waterproof the heat flux meter when submerged in fluid because the internal impedance of the meter is several orders of magnitude less than the resistance between the signal transmission wires and the fluid such as water normally found within the heat exchanger. Additionally, electrolytic EMF's resulting from any primary cell action between the dissimilar metals of the transducer will be self negating because both upper and lower surfaces of the heat flux meter are typically composed of substantially the same metals.

The layers of the heat flux meter can be laminated together and installed within the heat exchanger tube by the following methods. The three layers may be laminated together outside the heat exchanger tube by a joining process such as swaging, diffusion welding and/or brazing and then subsequently posistioned within the heat flux meter and then diffusion welded, swaged, brazed, or by a combination of diffusion welding, swaging and brazing mounted on the inner wall of the heat exchanger tube, in order to create a homogeneous bond between the meter and the tube.

It is an object of the present invention therefore to provide an accurate heat flow measurement apparatus to determine high heat flux rates passing through at least a portion of the surfaces of a heat exchanger tube. Another object of the present invention is to provide a heat flux meter that minimizes the disruption of fluid flowing through the heat exchanger tube where the heat flux meter is installed.

A feature of the present invention is the installation of a heat flux meter by the diffusion welding, swaging, and/or brazing of the meter to the inner wall of a heat exchanger tube.

Another feature of the present invention is the measurement of the heat flux through a heat exchanger tube by a heat flux meter that is submerged within a flowing fluid heat transfer medium, the meter being operatively contacted to the inner wall of a heat exchanger tube by a method such as diffusion welding, swaging, or brazing.

Another feature of the present invention is that no insulation is required between the thermocouple layers in order for the device to operate properly.

These and other features, objects and advantages of the present invention will become apparent from the following detailed description, wherein reference is made to the figures in the accompanying drawings.

DESCRIPTION OF THE PREFERRED EMBODIMENT

Figure 1:
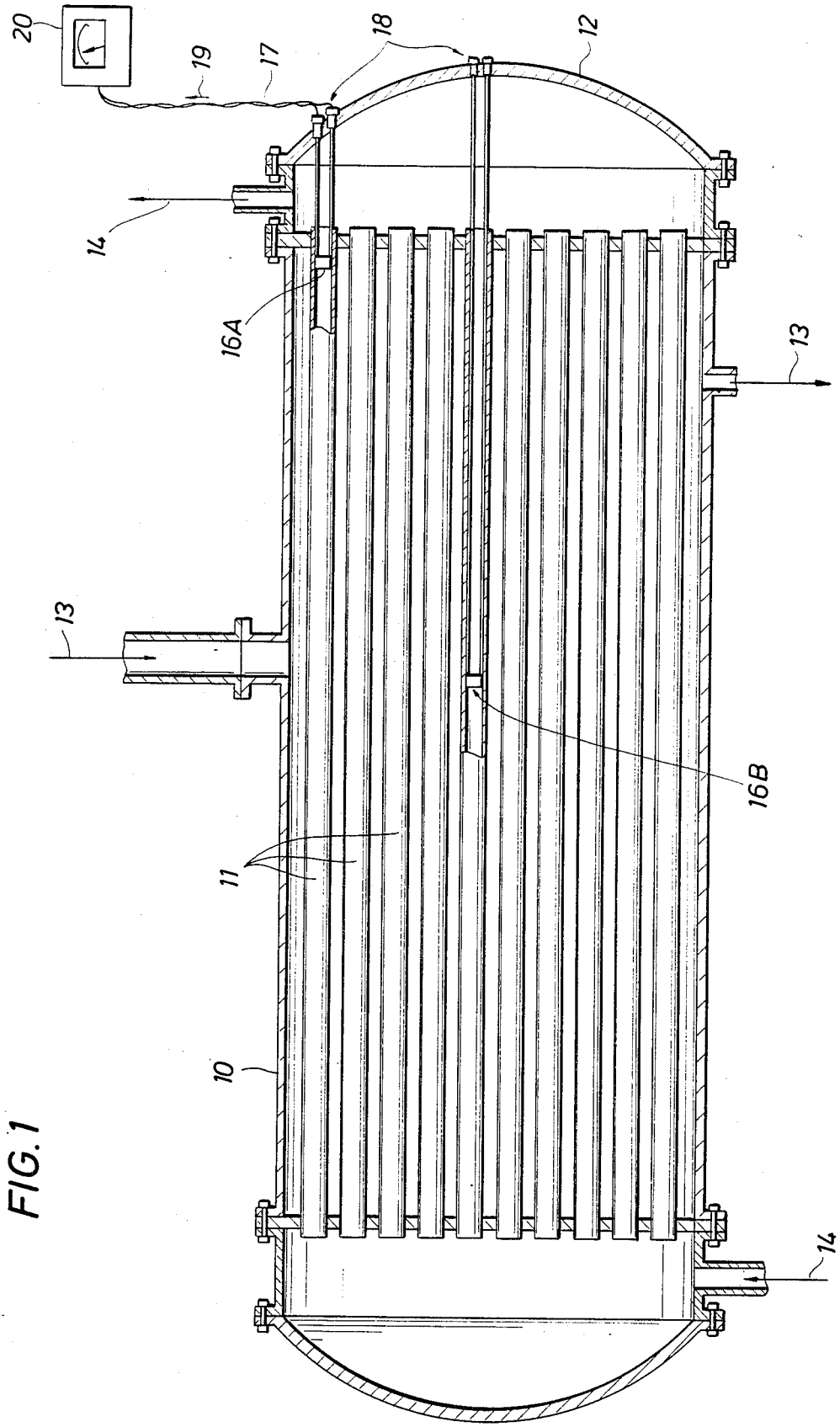
FIG. 1 is a schematic representation of a heat exchanger having heat exchanger tubes with heat flux meters installed therein.

Referring now to FIG. 1 a heat exchanger 10 having heat exchanger tubes 11 retained within a pressure shell 12 is shown capable of exchanging heat between steam 13 and a heat transfer fluid such as feed water 14 in a heat transfer process as is well known to the art. Heat flux meters 16A, 16B the objects of the present invention are shown positioned within different heat exchanger tubes 11. As explained later these meters 16A, 16B measure the flow of heat or heat flux through the surface of the particular portions of the heat exchanger tubes 11 that the meters 16A, 16B are installed adjacent to. Leads 17 passing through pressure fittings 18 carry a signal 19 to an appropriate heat flux indicator instrument 20. The pressure fittings 18 may comprise in a preferred embodiment CONAX MHM glands, manufactured by CONAX Corp., 2300 Walden Avenue, Buffalo, NY 14225, having a pressure rating up to 10,000 psi and a temperature rating from −300° F. to 1850° F.

Figure 2:
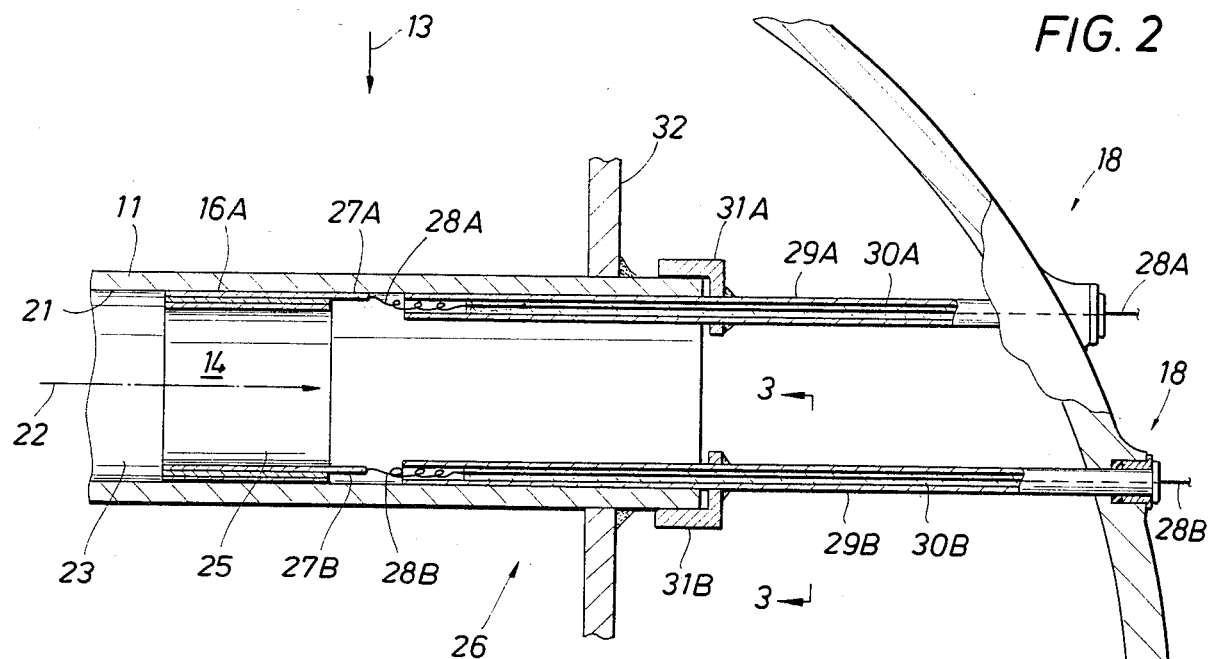
FIG. 2 is a schematic representation showing in more detail the installation of a particular heat flux meter.

Referring now to FIG. 2 heat flux meter 16A is shown in more detail installed within a chromium Molybdenum alloy tube 11, the tube 11 having an inner wall 21 and a central longitudinal axis 22. In a preferred embodiment the inner wall 21 of the heat exchanger tube 11 is circular in shape and arranged concentric to the central longitudinal axis 22 of the tube 11. The heat flux meter 16A is shown positioned within throughbore 23 of tube 11, the heat flux meter 16A having a flow opening 25 capable of allowing the feedwater 14 to pass through the central section thereof.

Electrical connection means 26 consisting of terminals 27A, 27B, lead wires 28A, 28B, support tubes 29A, 29B, ceramic liners 30A, 30B, and pressure fittings 18, are used to place the heat flux meter 16A in electrical communication with the heat flux indicator instrument 20 (FIG. 1). Support tubes slides 31A, 31B are shown operatively connected to the support tubes 29A, 29B, respectively, and are slideably engaged with the end portion of tube 11, in order to allow for thermal expansion of the electrical connection means 26 support tubes 29A, 29B and also to allow for any movement of tube 11 relative to firewall 32.

Figure 3:
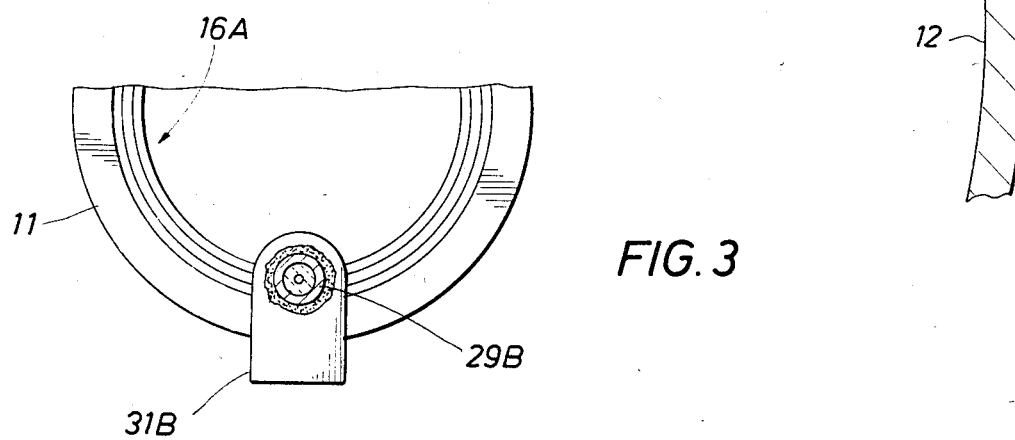
FIG. 3 is a partial view in cross section take along lines 3—3 of FIG. 2 showing the installation of a typical support tube slide.

Referring now to FIG. 3, the support tube 29B can be seen to pass through a central portion of the support tube slide 31B, the tube 29B and slide 31B axially aligned in this example with terminal 27B.

Figure 4:
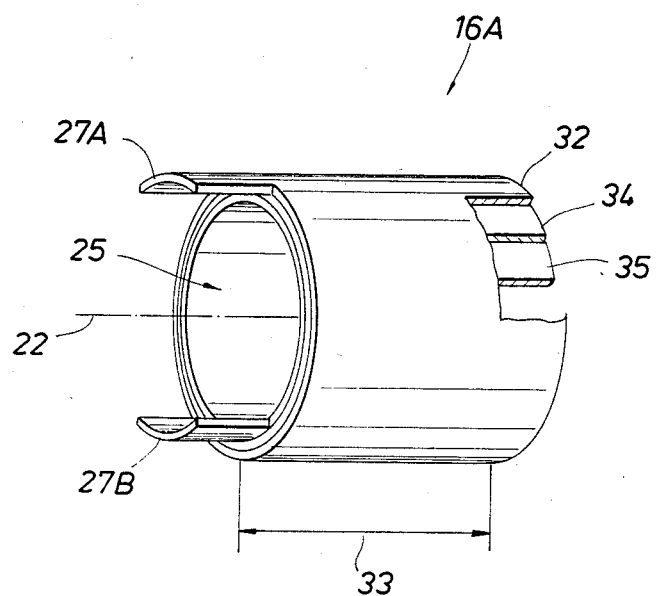
FIG. 4 is a diagramatic isometric view taken in cross section showing in more detail the hollow cylinders which form a typical heat flux meter.

Referring now to FIG. 4 heat flux meter 16A can be seen to comprise a first hollow cylinder 32 having a selected length 33 and formed for example from a first conductive metal such as chromel. The first hollow cylinder 32 has an inner diameter and an outer diameter (not labeled for clarity). At least a portion of the outer diameter of the first hollow cylinder 32 is sized so as to be capable of operatively contacting and therefore forming a homogeneous bond with the inner wall 21 (FIG. 2) of the heat exchanger tube 11 (FIG. 2) when the cylinder 32 is expanded radially outward, diffusion welded, and/or brazed to the inner wall 21 of the tube 11.

A second hollow cylinder 34 of a selective length 33 is formed from a second thermoelectric conductive metal such as Constantan, well known to the art, which is dissimilar from the first conductive metal and which typically comprises 60–45% by weight of copper, 40–55% by weight of nickel, and 0.0–1.4% manganese. The second hollow cylinder 34 has an inner diameter and an outer diameter (not labeled for clarity), at least a portion of the outer diameter sized so as to be capable of operatively contacting and therefore forming a homogeneous bond with the inner diameter of the first hollow cylinder 32 when cylinder 34 is swaged, diffusion welded, or brazed to the inner diameter of cylinder 32. It is well recognized that many different types of conductive thermoelectric material may be used to form the second cylinder 34.

A third hollow cylinder 35 is shown positioned within the second hollow cylinder 34, having a selective length 33 and formed from a third conductive metal such as chromel which is dissimilar from the metal which forms the second cylinder 34. The third hollow cylinder 35 has an outer diameter and an inner diameter, at least a portion of the outer diameter of the third hollow cylinder 35 being sized so as to be capable of operatively contacting the inner diameter of the second hollow cylinder 34 when cylinder 35 is expanded radially outward, or diffusion welded, or brazed to the inner diameter of cylinder 34. It is well recognized that the length 33 of each cylinder 32, 34, 35 may be selected equal with one another but it is not necessary for each cylinder 32, 34, 35 to be of equal length for the heat flux meter 16A to function properly. It should also be recognized that wherein each of the ends of the cylinders 32, 34, 35 are shown aligned with each other so as to form a common edge flush with each other cylinder, 32, 34, 35, the cylinders 32, 34, 35 may be of different lengths 33. It is only necessary that at least a portion of each cylinder 32, 34, 35 contact each adjacent cylinder 32, 34, 35 for the heat flux meter 16A to operate properly.

It should also be recognized that wherein in a preferred embodiment the first conductive metal and the third conductive metal are similar and are formed from chromel, many other different conductive metals may be used in their place in order for the heat flux meter to operate. It is only necessary that the conductive metals on either side of cylinder 34 be different or dissimilar from the second conductive metal which forms the second hollow cylinder 34. The metals which form these cylinders 32, 34, 35 should typically be selected so as to generate the highest EMF vs. a given change in temperature.

Terminals 27A, 27B which form a portion of the electrical connection means 26 (FIG. 2) are shown operatively contacting the first hollow cylinder 32 and the third hollow cylinder 35, respectively, and in combination with the other elements of the electrical connections means 26 are capable of placing the first hollow cylinder 32 and the third hollow cylinder 35 in electrical communication with heat flux indicator instrument 20 (FIG. 1).

As can be seen in viewing FIG. 4 a flow opening 25 is defined by the inner diameter of the third hollow cylinder 35 through the center of the cylinder 35, the flow opening 25 being located in a preferred embodiment concentric to the central longitudinal axis 22 of the heat exchanger tube 11 (FIG. 2). Since no insulation is required between the cylinders 32, 34, 35 the frontal cross sectional area presented as a restriction to any flow through the flow opening 25 is minimized, which thereby results in a minimum disruption to the normal heat transfer mechanisms between the tube 11 and the feed water 14 (FIG. 1).

Figure 5:
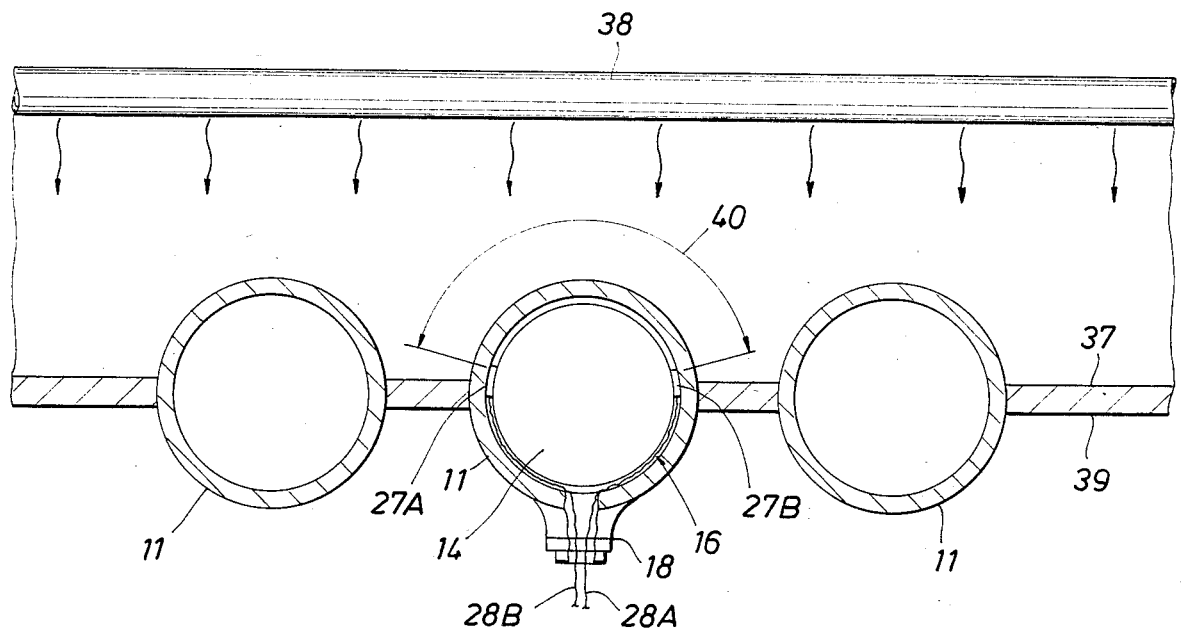
FIG. 5 is a schematic representation showing a heat flux meter installed within a heat exchanger tube, the tube forming part of an array of heat exchanger tubes connected to a membrane wall formed a selective distance away from a particular heat source.

Referring now to FIG. 5, a heat flux meter 16C is shown positioned within a particular heat exchanger tube 11. Unlike the heat exchanger 10 shown in FIG. 1, however, the heat exchanger tubes 11 are shown connected to one another by a membrane wall 37, one side of the wall 37 typically exposed to the heat source 38, the other relatively cooler side 39 of the membrane wall 37 being the side upon which the leads 28A and 28B connected to the heat flux meter 16C are passed through pressure fitting 18. Selective location of terminals 27A, 27B defines a particular heat flux measurement viewing area 40. In other words, selective orientation of terminals 27A, 27B may be used to selectively orientate the preferred area of measurement of the heat flux from a particular heat source 38, a feature that is not available in most other thermocouples.

Referring now to FIGS. 6, 6A, 7, and 7A, the heat flux meter 16 may be assembled within a portion of the heat exchanger tube 11 by several processes.

Figure 6:
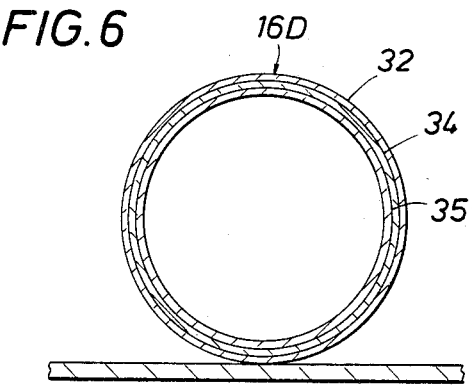
FIG. 6 is a schematic representation showing a heat flux meter after the hollow cylinders forming the heat flux meter have been joined by a process such as diffusion welding, swaging, or brazing.

For example, the heat flux meter 16D as shown in FIG. 6 may be operatively contacted or laminated together outside of the heat exchange tube 11 (FIG. 6A), by diffusion welding the inner diameter of the first hollow cylinder 32 and the outer diameter of the third hollow cylinder 35 to the outer diameter and the inner diameter respectively of the second hollow cylinder 34.

In the diffusion welding process the metals to be joined are thoroughly cleaned and placed in intimate contact and maintained at a low pressure such as a vacuum while their temperature is raised. The temperature is selected so as to facilitate a very localized well defined bond to be developed by a diffusion process across the initial boundary by means well known to the art. The temperature to be used depends of course on the metals to be bonded together.

After the diffusion welding process is completed metal may be removed from the outer diameter of the first hollow cylinder 32 by use, for example, of a metal lathe in order to insure a slip fit between the inner wall 21 of the heat exchanger tube 11 and the outer diameter of the first hollow cylinder 32.

Figure 6A:
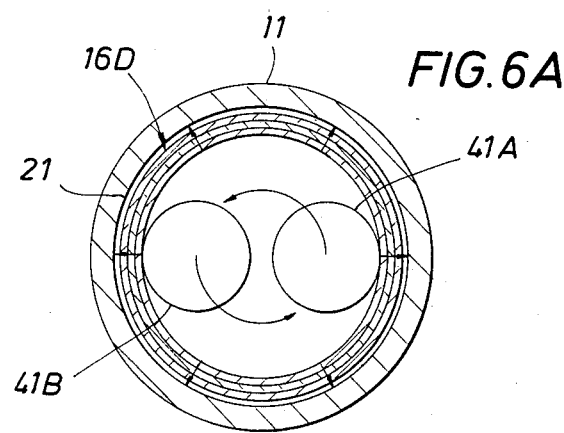
FIG. 6A is a schematic representation showing the heat flux meter being roller-swaged into contact with the inner wall of a heat exchanger tube.

The assembled heat flux meter 16D may then be positioned within at least a portion of the heat exchanger tube 11. It is well recognized that the entire heat flux meter 16D need not be inserted wholly within the heat exchanger tube 11. In other words, a portion of the meter 16D may extend outward from the end of the tube 11. Once the meter 16D is positioned within at least a portion of the heat exchanger tube 11 at least a portion of the cylinders 32, 34, 35 may be radially expanded outward such as by the process of roll-swaging as shown in FIG. 6A utilizing rollers 41A, 41B which contact the inner diameter of the third hollow cylinder 35 and deform the entire heat flux meter 16D structure radially outward until the outer diameter of the first hollow cylinder 32 operatively contacts in a substantial manner the inner wall 21. Reviewing this process the heat flux meter 16D is initially assembled outside of the heat exchanger tube 11, positioned within the tube 11, and thereafter radially expanded outward in a manner to contact the outer portion of the heat flux meter 16D with the inner wall 21 of the heat exchanger tube 11.

Another process may be used to assemble the heat flux meter 16D. The layers 32, 34, 35 of the meter 16D may be brazed together. The entire meter 16D, after assembly by brazing, (or diffusion welding, swaging, etc.), may also be brazed to the inner wall 21 of the heat exchanger tube 11.

The brazing process involves introduction of a braze material in paste, or foil form to the surfaces of the heat flux meter 16D. The cylinders 32, 34, 35 may then be lightly swaged into place and then by induction heating or a similar heating process the brazing material may be melted. It is well recognized that many different brazing processes may be used depending upon the materials that are to be joined to one another. Braze materials may be obtained for this process from Handy and Harman Corp., 850-A Third Avenue, N.Y., NY 10022 or from Fusion Corporation, 4658 E 35th Street, Willoughby, Ohio 44094.

Figure 7:
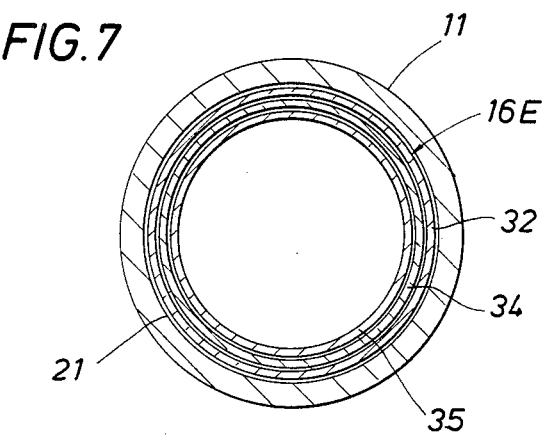
FIG. 7 is a schematic representation showing three hollow cylinders which are used to form the heat flux meter positioned within the heat exchanger tube.
Figure 7A:
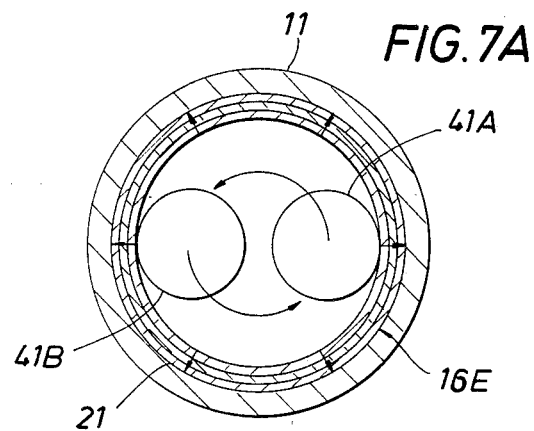
FIG. 7A is a schematic representation showing each individual hollow cylinder being roller-swaged into position within the heat exchanger tube.

Referring now to FIGS. 7, 7A another method may be used to assemble the heat flux meter 16E within the heat exchanger tube 11. Each cylinder 32, 34, 35 may be placed within one another and the entire unassembled collection of concentric cylinders 32, 34, 35 thereafter positioned within the heat exchanger tube 11. The entire assembly may then be swaged outward by rollers 41A, 41B until the third cylinder 35 comes into contact with the second cylinder 34 and thereafter the roll-swaging process is continued until the second cylinder 34 comes into contact with the first cylinder 32. The roll-swaging process may be continued further until the now assembled heat flux meter 16E comes into contact with the inner wall 21 of the heat exchanger tube 11. The swaging process may be done by rollers or hydraulically, in a manner as set forth in U.S. Pat. No. 3,979,810.

In summary, several methods such as diffusion welding, brazing, and swaging may be used singly or in combination with one another to assemble the heat flux meter 16D cylinders 32, 34, 35 and to install the meter 16D within the tube 11. After installation, the meter 16 is subsequently submerged within the flowing heat transfer medium 14 as it flows through the interior of the tube 11. It is well recognized that other methods of meter assembly and meter installation within tube 11 may be used to accomplish the same mechanical results.

Once the heat flux meter 16D shown in FIG. 6 or the heat flux meter 16E shown in FIG. 7 has been assembled and operatively contacted to the inner wall 21, electrical connection means 26 (FIG. 2) may be provided and operatively contacted to the first hollow cylinder 32 and the third hollow cylinder 35 thereby placing the first hollow cylinder 32 and the third hollow cylinder 35 in electrical communication with an instrument 20 (FIG. 1), prior to the step of determining the value of the signal 19 generated by the heat flux meter apparatus.

The value of this signal 19 may be interpreted after consideration of the principles of operation of a heat flux meter 16 of this type. The flow of heat to or from a surface, the surface in this case being the inner wall 21 of the tube 11, on which the heat flux meter 16 is placed creates a small temperature difference between the upper and lower surfaces of the heat flux meter 16. These surfaces are in thermal contact with a miniature high temperature thermopile in the preferred embodiment consisting of the second hollow cylinder 34, which generates a direct current signal 19 resulting from this temperature difference. The thermoelectric element therefore represented by the second hollow cylinder 34 yields signals which may be measured by a microvolt meter such as the indicator instrument 20 (FIG. 1). Because each heat flux meter 16 is self powered, no excitation voltage is necessary.

After the heat flux meter 16 attains thermal equilibrium (in approximately 1/10 of a second) with the inner wall 21 of the heat exchanger tube 11 the voltage generated by the meter 16 will be proportional to the heat flux passing through that portion of the heat exchanger tube 11 that the meter 16 is mounted upon. When the value of this output voltage is multiplied by a specific calibration constant the resulting value will indicate the heat gain (or loss) through that portion of the heat exchanger tube 11 in terms of btu's/hour per square foot.

This proportionality constant, also known as the calibration constant of the meter, can be determined empirically by means well known to the art. For example, a meter 16 may be placed in a controlled, calibrated heat flux environment and subjected to values of heat flux that would be encountered in an actual installation, and the resultant heat flux vs. millivolt output of the meter subsequently recorded for later reference at the final installation location for that meter.

Many other variations and modifications may be made in the apparatus and techniques hereinbefore described by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

We claim as our invention:

1. A heat flux meter apparatus for determining the flow of heat through a portion of a surface of a heat exchanger tube, said tube having a central longitudinal axis and a throughbore defined therethrough, the inner wall of said heat exchanger tube being cylindrical in shape and arranged concentric to said central longitudinal axis, said heat flux meter apparatus comprising;

a first hollow cylinder of a selected length formed from a first conductive metal, said first hollow cylinder having an inner diameter and an outer diameter, at least a portion of said outer diameter of said first hollow cylinder operatively contacting the inner wall of said heat exchanger tube, a second hollow cylinder of a selective length formed from a second thermoelectric conductive metal dissimilar from said first conductive metal, said second hollow cylinder having an inner diameter and an outer diameter, at least a portion of said outer diameter of said second hollow cylinder operatively contacting the inner diameter of said first hollow cylinder, a third hollow cylinder of a selective length formed from a third conductive metal dissimilar from said second conductive metal, said third hollow cylinder having an outer diameter and an inner diameter, at least a portion of said outer diameter of said third hollow cylinder operatively contacting the inner diameter of said second hollow cylinder, and electrical connection means operatively contacting said first hollow cylinder and said third hollow cylinder of said heat flux meter apparatus and being capable of placing said first hollow cylinder and said third hollow cylinder in electrical communication via said electrical connection means with an instrument for determining the flow of heat through the heat exchanger tube.

2. The apparatus of claim 1 wherein the lengths of all of said cylinders are selected equal.

3. The apparatus of claim 2 wherein each of the ends of the cylinders of equal length is aligned with each other end so as to form a common edge flush with each other cylinder.

4. The apparatus of claim 1 wherein said first conductive metal and said third conductive metal are similar.

5. The apparatus of claim 1 wherein the inner diameter of said third hollow cylinder forms a flow opening defined through the center of said cylinder, said flow opening located concentric to the central longitudinal axis of said heat exchanger tube.

6. A heat flux meter apparatus for use in determining the flow of heat through a portion of a surface of a heat exchanger tube, said tube having a central longitudinal axis and a throughbore defined therethrough, the inner wall of said heat exchanger tube being cylindrical in shape and arranged concentric to said central longitudinal axis, said heat flux meter apparatus comprising;

a first hollow cylinder of a selected length formed from a first conductive metal, said first hollow cylinder having an inner diameter and an outer diameter, at least a portion of said outer diameter of said first hollow cylinder operatively contactable with the inner wall of said heat exchanger tube, a second hollow cylinder of a selective length formed from a second thermoelectric conductive metal dissimilar from said first conductive metal, said second hollow cylinder having an inner diameter and an outer diameter, at least a portion of said outer diameter of said second hollow cylinder operatively contactable with the inner diameter of said first hollow cylinder, a third hollow cylinder of a selective length formed from a third conductive metal dissimilar from said second conductive metal, said third hollow cylinder having an inner and an outer diameter, at least a portion of said outer diameter of said third hollow cylinder operatively contactable with the inner diameter of said second hollow cylinder, and electrical connection means operatively contactable with said first hollow cylinder and said third cylinder of said heat flux meter apparatus and being capable of placing said first hollow cylinder and said third hollow cylinder in electrical communication via said electrical connection means with an instrument for determining the flow of heat through the heat exchanger tube.

7. A method of determining the flow of heat through a portion of a surface of a heat exchanger tube by use of a heat flux meter apparatus, said heat exchanger tube having;

a central longitudinal axis and a throughbore defined therethrough, the inner wall of said heat exchanger tube being cylindrical in shape and arranged concentric to said central longitudinal axis, said heat flux meter apparatus having;

a first hollow cylinder of a selected length formed from a first conductive metal, said first hollow cylinder having an inner diameter and an outer diameter, a second hollow cylinder of a selective length formed from a second thermoelectric conductive metal dissimilar from said first conductive metal, said second hollow cylinder having an inner diameter and an outer diameter, at least a portion of said second cylinder positionable within said inner diameter of said first cylinder, and a third hollow cylinder of a selective length formed from a third conductive metal dissimilar from said second conductive metal, said third hollow cylinder having an inner diameter and an outer diameter, at least a portion of said third cylinder positionable within said inner diameter of said second cylinder, said method of determining the heat flow through a portion of a heat exchanger tube comprising;

assembling said cylinders to form said heat flux meter apparatus by operatively contacting at least a portion of the inner diameter and outer diameter of the first hollow cylinder and the third hollow cylinder respectively to the outer diameter and the inner diameter of the second hollow cylinder, installing said assembled heat flux meter apparatus within said heat exchanger tube by operatively contacting at least a portion of the outer diameter of said assembled heat flux meter apparatus to the inner wall of said heat exchanger tube, and thereafter, determining the value of a signal generated by said heat flux meter apparatus with a connected heat flux instrument.

8. The method of claim 7 including, prior to the step of determining the value of a signal generated by said heat flux meter apparatus, the steps of;

providing electrical connection means, operatively contacting said electrical connection means to said first hollow cylinder and said third hollow cylinder, and placing said first hollow cylinder and said third hollow cylinder in electrical communication with the instrument.

9. The method of claim 7 wherein the step of assembling said cylinders to form said heat flux meter apparatus further includes the steps of;
    positioning at least a portion of said third cylinder within said second cylinder,
    swaging said third cylinder outward until at least a portion of said third cylinder operatively contacts said second cylinder,
    positioning at least a portion of said second cylinder within said first cylinder, and
    swaging said third cylinder and said second cylinder outward until at least a portion of said second cylinder operatively contacts said first cylinder.

10. The method of claim 7 wherein the step of assembling said cylinders to form said heat flux meter apparatus is done by;
    diffusion welding the inner diameter of said first hollow cylinder and the outer diameter of said third hollow cylinder to the outer diameter and the inner diameter respectively of said second hollow cylinder.

11. The method of claim 7 wherein the step of assembling said cylinders to form said heat flux meter apparatus is done by;
    brazing the inner diameter of said first hollow cylinder and the outer diameter of said third hollow cylinder to the outer diameter and the inner diameter respectively of said second hollow cylinder.

12. The method of claim 7 wherein the step of installing said assembled heat flux meter apparatus within said heat exchanger tube is done by;
    swaging at least a portion of the outer diameter of said assembled heat flux meter apparatus to the inner wall of said heat exchanger tube.

13. The method of claim 7 wherein the step of installing said assembled heat flux meter apparatus within said heat exchanger tube is done by;
    brazing at least a portion of the outer diameter of said assembled heat flux meter apparatus to the inner wall of said heat exchanger tube.

14. The method of claim 7 wherein the step of installing sid assembled heat flux meter apparatus within said heat exchanger tube is done by;
    diffusion welding at least a portion of the outer diameter of said assembled heat flux meter apparatus to the inner wall of said heat exchanger tube.

15. The method of claim 7 wherein the steps of assembling said cylinders to form said heat flux meter apparatus and installing said heat flux meter apparatus within said heat exchanger tube further includes the steps of;
    diffusion welding the inner diameter of said first hollow cylinder and the outer diameter of said third hollow cylinder to the outer diameter and the inner diameter respectively of said second hollow cylinder,
    removing any metal necessary to insure a slip fit between the inner wall of said heat exchanger tube and the outer diameter of said first hollow cylinder,
    positioning said hollow cylinders of said assembled heat flux meter apparatus within at least a portion of said heat exchanger tube,
    expanding at least a portion of said hollow cylinders of said assembled heat flux meter apparatus radially outward, thereby
    contacting at least a portion of the outer diameter of said first hollow cylinder of said heat flux meter apparatus to the inner wall of said heat exchanger tube, and thereafter,
    determining the value of a signal generated by said heat flux meter apparatus.

16. A method of determining the flow of heat through a portion of a surface of a heat exchanger tube by use of a heat flux meter apparatus,
    said heat exchanger tube having;
        a central longitudinal axis and a throughbore defined therethrough, the inner wall of said heat exchanger tube being cylindrical in shape and arranged concentric to said central longitudinal axis,
    said heat flux meter apparatus having;
        a first hollow cylinder of a selected length formed from a first conductive metal, said first hollow cylinder having an inner diameter and an outer diameter,
        a second hollow cylinder of a selective length formed from a second thermoelectric conductive metal dissimilar from said first conductive metal, said second hollow cylinder having an inner diameter and an outer diameter, at least a portion of said second cylinder positionable within said inner diameter of said first cylinder, and
        a third hollow cylinder of a selective length formed from a third conductive metal dissimilar from said second conductive metal, said third hollow cylinder having an inner diameter and an outer diameter, at least a portion of said third cylinder positionable within said inner diameter of said second cylinder,
    said method of determining the flow of heat through a portion of a surface of a heat exchanger tube comprising;
        assembling said cylinders to form said heat flux meter apparatus by operatively contacting at least a portion of the inner diameter and outer diameter of the first hollow cylinder and the third hollow cylinder to the outer diameter and the inner diameter respectively of the second hollow cylinder,
        installing said assembled heat flux meter apparatus within said heat exchanger tube by operatively contacting at least a portion of the outer diameter of said assembled heat flux meter apparatus to the inner wall of said heat exchanger tube,
        flowing fluid through said heat exchanger tube, and
        determining the value of a signal generated by said heat flux meter apparatus with a connected heat flux instrument.

* * * * *